United States Patent [19]

Arquie et al.

[11] 4,345,321

[45] Aug. 17, 1982

[54] SEMICONDUCTOR LASER SOURCE OPTICAL READING HEAD

[75] Inventors: Louis Arquie; Claude Bricot; Michel Thirouard, all of Paris, France

[73] Assignee: Thomson-CSF, Paris, France

[21] Appl. No.: 162,635

[22] Filed: Jun. 24, 1980

[30] Foreign Application Priority Data

Jun. 26, 1979 [FR] France .................................. 79 16898

[51] Int. Cl.³ .............................................. G11B 7/12
[52] U.S. Cl. .................................... 369/46; 346/76 L; 369/112; 369/122
[58] Field of Search ................ 346/76 L, 108; 350/91; 357/17, 19; 358/127, 128.5; 369/44, 45, 46, 110, 111, 112, 118, 120, 121, 122

[56] References Cited

U.S. PATENT DOCUMENTS

| 3,016,464 | 1/1962 | Bailey | 219/121 LZ |
|---|---|---|---|
| 4,004,259 | 1/1977 | Kaneko | 369/122 X |
| 4,143,402 | 3/1979 | Bricot et al. | 369/112 X |
| 4,163,149 | 7/1979 | Sawano et al. | 369/121 X |
| 4,203,133 | 5/1980 | Bricot et al. | 369/44 |

FOREIGN PATENT DOCUMENTS

| 54-103307 | 8/1979 | Japan | 369/122 |
|---|---|---|---|
| 54-116904 | 9/1979 | Japan | 369/112 |

Primary Examiner—Bernard Konick
Assistant Examiner—Donald McElheny, Jr.
Attorney, Agent, or Firm—Oblon, Fisher, Spivak, McClelland & Maier

[57] ABSTRACT

A semiconductor laser source optical head for reading reflecting information carriers. The information is recorded on a track carried by the carrier in the form of a relief modulation. The device comprises a laser and an optical projection device for forming a reading spot which is an image of the source on the carrier. The laser is positioned on the optical axis of the optical device in such a way that the beam from the laser substantially illuminates half the entrance pupil of the optical system. The return beam reflected by the support emerges on the other half of the pupil. A deviating member is placed on the path of the return beam in order to displace the beam relative to the outward beam. Detection cells are conveniently placed in a detection plane parallel to the supports.

8 Claims, 13 Drawing Figures

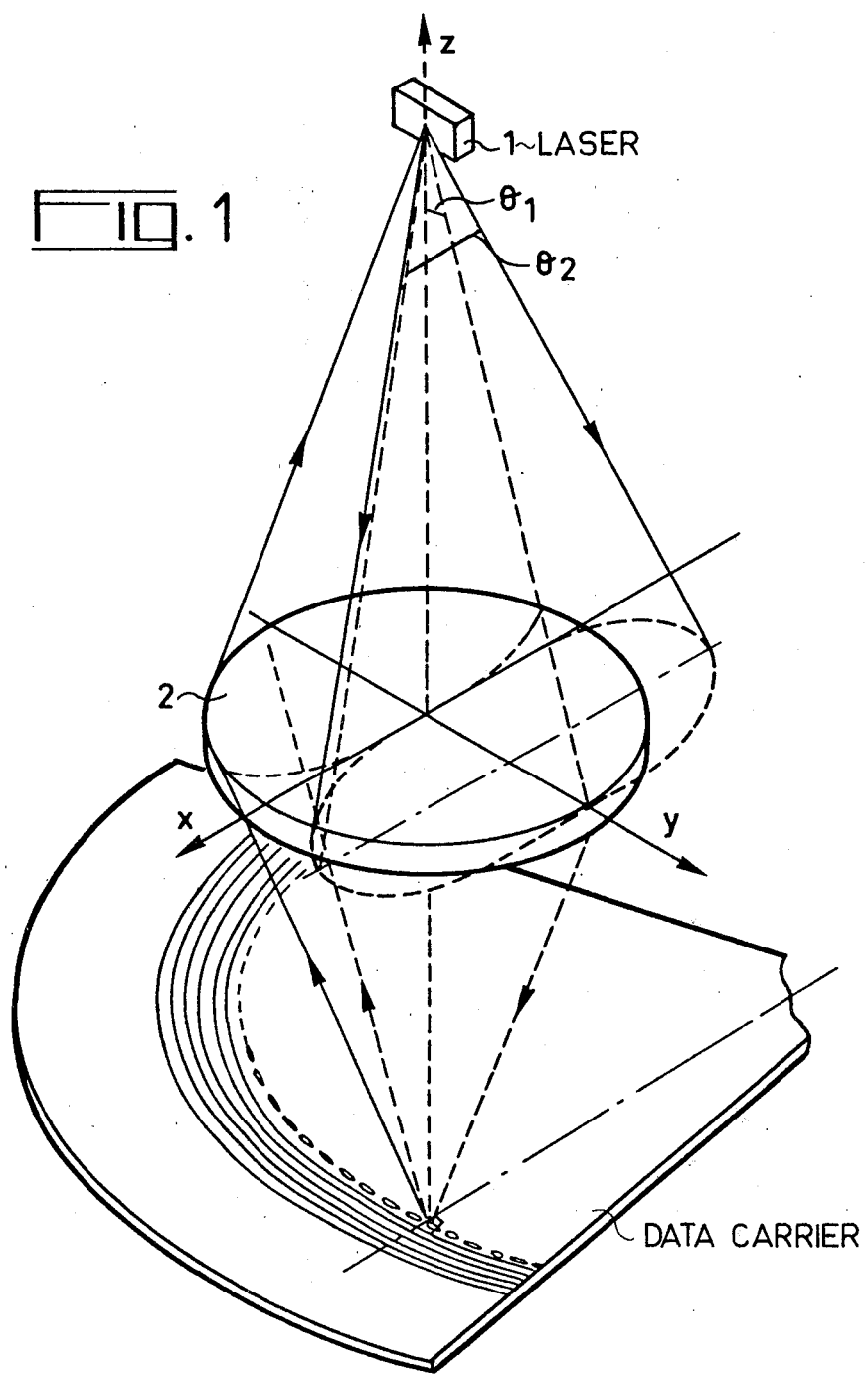

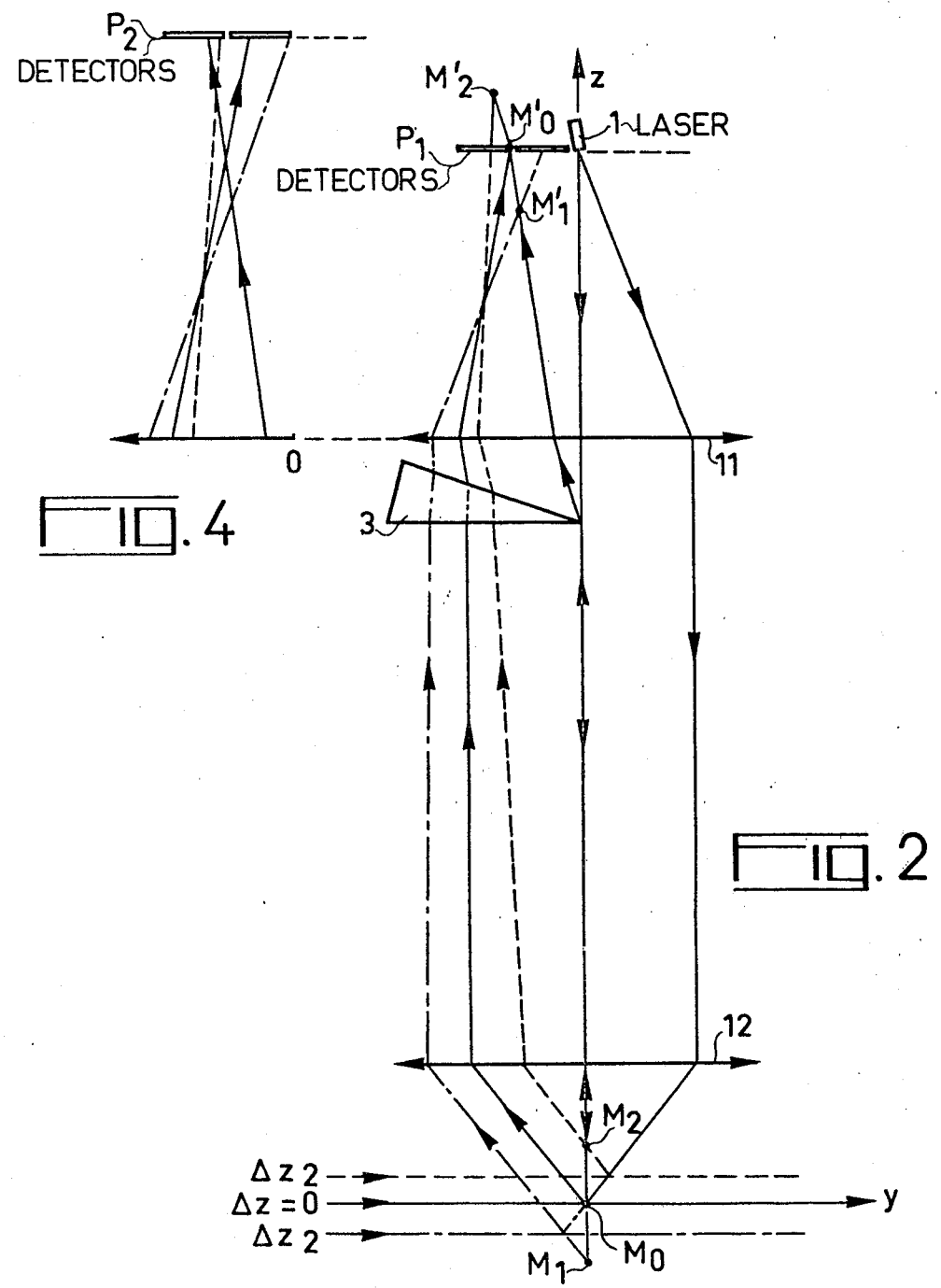

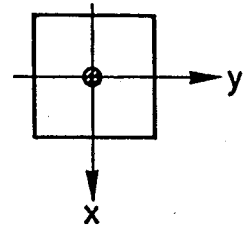
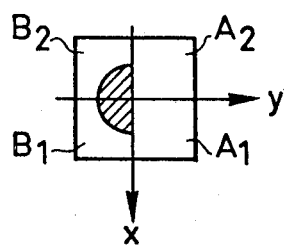
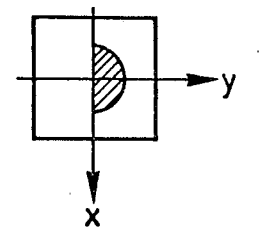
Fig. 3-b   Fig. 3-a   Fig. 3-c
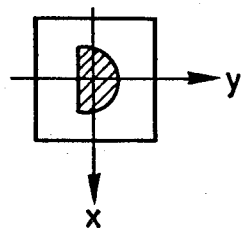
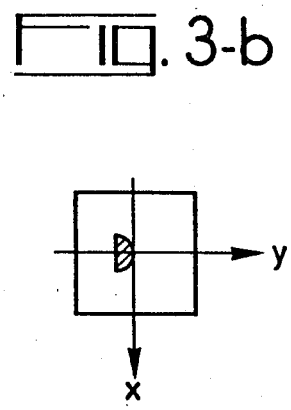
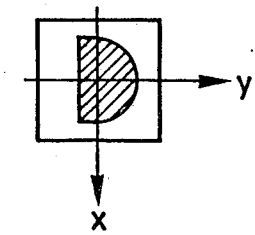
Fig. 5-b   Fig. 5-a   Fig. 5-c
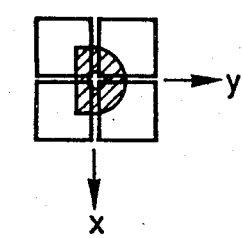
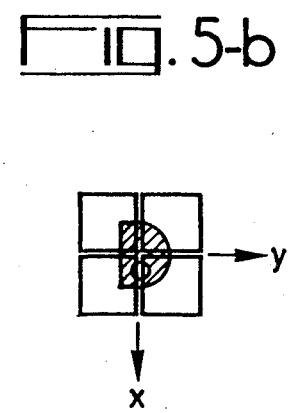
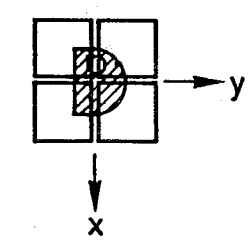
Fig. 6-b   Fig. 6-a   Fig. 6-c

SEMICONDUCTOR LASER SOURCE OPTICAL READING HEAD

BACKGROUND OF THE INVENTION

The present invention relates to the field of optically readable and recordable information carrier disks, whereby the information is recorded in the form of a two level relief modulation translating a frequency-modulated video signal or videodisk, an audio-modulated signal or audiodisk or binary signals when such a carrier is used as an information memory.

The invention more specifically relates to a semiconductor laser source optical reading head incorporating a reduced number of elements to form an optical head having low weight, small size and low cost. The invention also relates to an optical recording and/or reading device incorporating such an optical head.

In the laser source optical heads presently used for recording or reading information carrier disks, the laser source is placed on the axis of the optical reading or recording system and lights up the entrance pupil of the optical system in a symmetrical manner with respect to the axis, both in the direction y, tangential to the track carried by the carrier and in the radial direction, x, orthogonal to y in the plane of the support. In an optical device for reading by reflection and incorporating such an optical head, the reading signal and the vertical and radial variation signals result from the radiation reflected by the disk, so that it is necessary to provide supplementary optical elements for separating the reflected radiation from the incident radiation. Conventionally, this separation is obtained by successively placing on the optical axis a separating cube utilizing birefringence as a function of the polarizations of the radiation which it receives and a quarterwave plate. As the laser source is polarized in a linear manner, the radiation reflected by the support traverseing the quarter-wave plate has a polarization displaced by $\pi/2$ relative to that of the radiation from the source and this radiation is deflected by the cube. Such an optical head has a large number of cooperating members constituting a cumbersome assembly, with a relatively high cost and whose weight is too high to enable such a head to be radially moved rapidly.

BRIEF SUMMARY OF THE INVENTION

This invention proposes a laser source optical head which does not have the disadvantages referred to hereinbefore, whose members can be contained in a cylinder whose diameter does not exceed that of the reading lens and whose structure is particularly adapted to the reading beam supplied by a semiconductor laser source, whose emissive face is in the shape of a rectangular window. The beam from such a laser has different divergence characteristics in the two orthogonal axes. Such a reading head can also comprise, associated with the same optical projection members, a semiconductor laser source permitting the recording of the information on the carrier. Recording and reading can then take place successively by means of two closely juxtaposed spots.

The present invention therefore relates to a semiconductor laser source optical reading head incorporating an optical projection device for forming in the plane of an information carrier reflecting a reading spot, which is the image of the source by said device, the laser having an emissive face defined by a rectangular window, wherein the emissive face of the laser source is oriented in such a way that the beam from the laser asymmetrically lights up the entrance pupil of the optical projection device, a deflecting member being placed in the path of the reflected beam from the projection device in order to displace the image formed by reflection on the information carrier with respect to the emissive face of the laser. The incident beam and the reflected return beam thus have paths which are at least partly separated and detection cells are provided for detecting the deflected beam.

BRIEF DESCRIPTION OF THE DRAWINGS

The invention is described in greater detail hereinafter relative to non-limitative embodiments and the attached drawings, which show:

FIG. 1 shows a simplified diagram of an optical reading head according to the invention.

FIG. 2 shows a first embodiment of the optical reading head according to the invention.

FIGS. 3a, 3b and 3c show light spots formed in the plane $P_1$ of FIG. 2, depending on whether the focusing error is zero, negative or positive.

FIG. 4 shows in part, a second embodiment of the optical reading head.

FIGS. 5a, 5b and 5c show light spots formed in the plane $P_2$ of FIG. 4, depending on whether the focusing error in 0, negative or positive.

FIGS. 6a, 6b and 6c show light spots formed in the detection plane, depending on whether the radial error is zero, negative or positive.

DETAILED DESCRIPTION OF THE PREFERRED EMBODIMENTS

Figure 7:
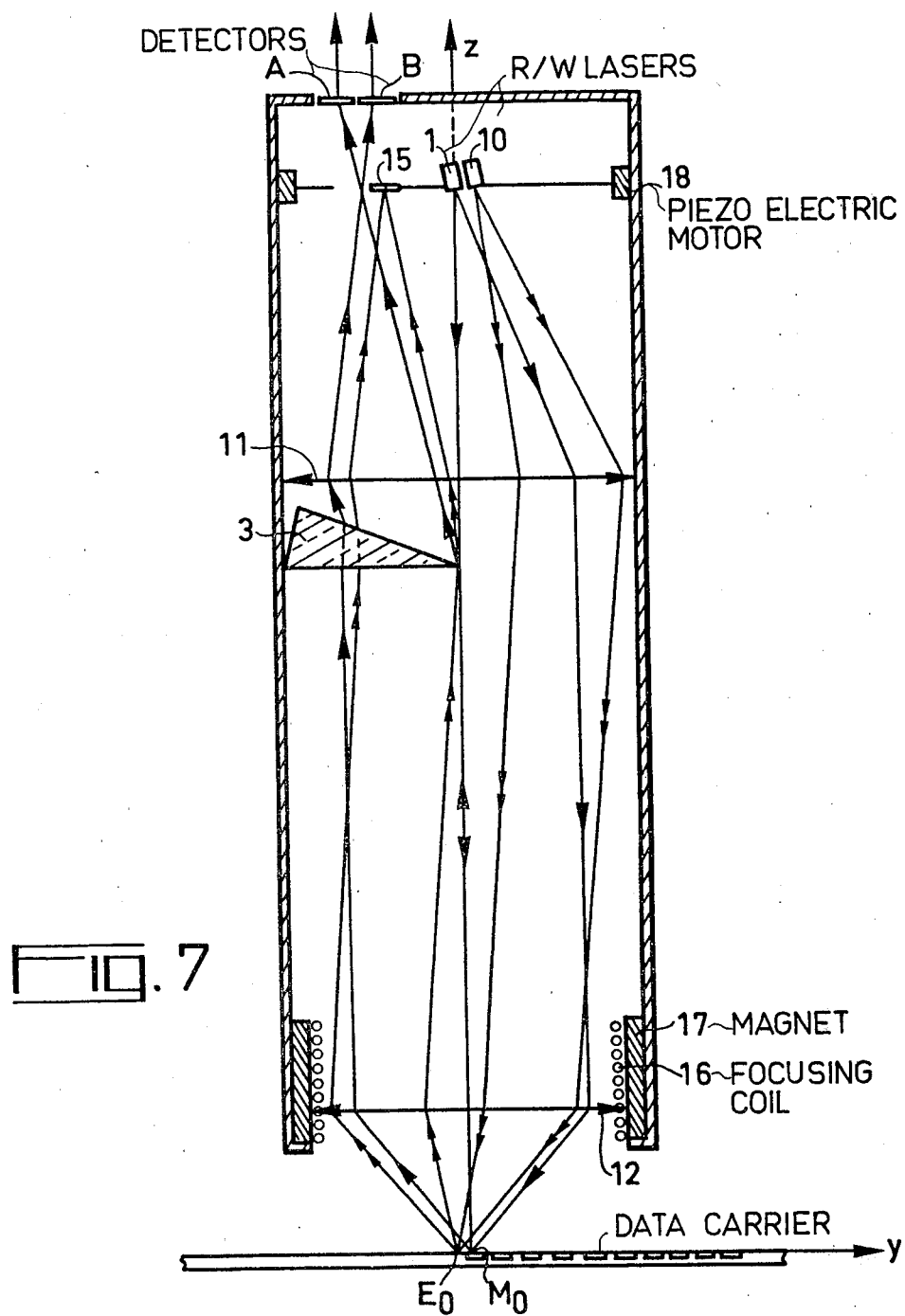
FIG. 7 shows a third embodiment of the optical reading head also permitting the recording function.

The optical head according to the invention is designed to ensure an optimum use of the radiation from a semiconductor laser source and has a minimum of optical components, thus making it lightweight and particularly easy to move.

A semiconductor laser source has an output face, whose dimensions of approximately 1 micrometer can, for example, be 1 $\mu m \times 5$ $\mu m$. In practice, the thickness of the thin emissive layer is less than 1 micrometer, whilst its width is less than 5 $\mu m$. The ratio between the two dimensions of the emissive layer varies from 7 to 3 for lasers having a sufficient power for recording. The beam emitted by such a source by the thus defined window roughly corresponds to the central border created by diffraction by the rectangular window. The higher orders have much lower levels compared with the central order because the intensity distribution in the window is not constant.

FIG. 1 shows the beam emitted by such a semiconductor laser source 1. Its aperture can for example be $\theta_1 = 8°$ in the direction of the large dimension of the emissive face and $\theta = 25°$ in the direction of the other dimension. The outlet face of the laser 1 is inclined relative to lens 2 in such a way that only half of this lens is illuminated by the beam emitted by the source. Bearing in mind, the shape of the light spot, a major part of the beam is trapped by lens 2, although only half of the lens is illuminated. As the reflecting support is parallel to the plane x, y of the lens, the beam reflected by the support is returned to the half of the lens not illuminated by the outward beam. If no supplementary means was provided the image of the focusing point on the disk would be formed in the output face of the semiconductor laser source. It would be possible to obtain a reading signal under such conditions. Experience has shown that the reflected radiation focused in the laser output face, whose intensity is a direct function of the information recorded on the disk (a non-reflecting hole leading to a drop in the reflected radiation intensity, whereas a reflecting non-hole leads to a maximum intensity) contributes directly to increasing or decreasing the output level of the laser radiation. Consequently, a detector photodiode placed on the rear face of the laser supplies a signal varying like the output radiation of the semiconductor laser and consequently directly linked with the information recorded on the disk. Thus, this signal can be used as a reading signal. However, for a correct reading, it is also necessary to obtain a signal characteristic of the focusing error along z and a radial error signal along x for following the track. These two signals cannot be directly detected. It is therefore necessary to form an image in a detection plane to obtain these signals. For minimum overall dimensions of the optical head, this image is formed in the vicinity of the optical axis by slightly deflecting the return beam reflected by the disk for example, both by means of a prism.

FIG. 2 shows a diagram in the y, z plane of the optical head according to the invention. It comprises a semiconductor laser source 1 and two lenses 11 and 12 forming an afocal optical system such that the output face of source 1 and the disk are located in conjugate planes when there is no focusing error, so that the radiation beam between the two lenses is a parallel beam. Thus, the beam reflected by the disk lights up the half-pupil of lens 12 not illuminated by the outward beam. When the surface of the disk coincides with the focal plane of lens 12, the return beam from said lens is parallel. This beam is deflected by means of a prism 3, whose edge is directed in accordance with axis x orthogonal to the plane of the drawing. This beam then lights up the half-pupil of lens 11 which is not illuminated by the outward beam and is focused on a point $M_0'$ conjugated by the optical system of the focusing point $M_0$ on the disk. Thus, the point is displaced relative to the optical axis z, said arrangement making it possible to place a group of detection cells in the plane on the same side as the source. These cells are arranged in a square in the four sectors defined by the axes in the x and y direction intersecting at $M_0'$ (FIG. 3a). The sum of the signals from these cells constitutes the reading signal. The focusing error signal is obtained by forming the difference between the sums of the signals from the cells having the same ordinate y. Thus, the light beam passing through the centre of light beam 12 perpendicular to the support is reflected in the same direction, no matter what the vertical dimension of the support. It is therefore always deflected in the same way by prism 3 and is projected in the plane of the cells to an ordinate $y_0$, which is invariable no matter what position the support assumes relative to the focusing point. However, the other extreme beam is projected to an ordinate y variable with the position. When the plane of the support is negatively displaced by $\Delta z_1$ the beam reflected by the support appears to come from a point $M_1$ further from the lens than $M_0$. Consequently, the beam which emerges from lens 12 is slightly convergent and is therefore focused by lens 11 into a point $M_1'$ which is closer to the said lens than point $M_0'$. The beam passing through the centre of lens 12 is invariable, so that the light spot formed in the plane of the cells is larger and only lights up cells $A_1$ and $A_2$ having a positive ordinate y. Conversely, when the support moves towards lens 12, the focusing deviation $\Delta z_2$ is positive and the radiation reflected by the said support seems to come from a point $M_2$ which is closer to lens 12 from $M_0$. Consequently the radiation from this lens is slightly divergent and the image of point $M_2$ by the optical system is formed at $M_2'$ which is more removed from lens 11 than $M_0'$. Therefore, the light spot is larger in the plane of the cells and only lights up cells $B_1$ and $B_2$ having a negative ordinate y (FIG. 3).

In practice, it can be difficult to place the detection cells in a plane located on the same side as the source when it is also desired to obtain the reading signal by means of these cells. Thus, the distance between the cells in the case of two adjacent cells is at least equal to a few dozen micrometers. The light spot formed in the plane on the same side as the source is approximately the same size as the light spot formed in the output face of the source, i.e. is approximately 1 micrometer. Thus, when the outward beam is well focused on the disk and the focusing deviation beam is kept equal to 0, the return light spot is formed in the space between the cells and no signal is detected.

FIG. 4 partly shows another embodiment in which the plane of the detection cells is located on a side higher than the source. Only the halflens 11 illuminated by the return beam is shown. The focusing point of this beam is unchanged ($M_0'$, $M_1'$ or $M_2'$, depending on whether the focusing error is zero, negative or positive). As the plane of the cells $P_2$ is more remote from the lens 11, the image formed in this plane is more extensive. These cells are arranged in the previously described manner and the separation axes thereof intersect at a point located in the vicinity of the vertical line passing through $M_0'$. Thus, the sum of the illuminations received by cells $A_1$ and $A_2$ having the same positive ordinate is the same as the sum of the illuminations received by cells $B_1$ and $B_2$ having the same negative ordinate, so that the focusing error signal is zero when the focusing error is zero. FIG. 5a shows the corresponding light spot, whilst FIGS. 5b and 5c show the corresponding light spots for a negative and positive variation or error respectively. Thus, the reading signal A can be obtained by summing the signals from the four detection cells $A_1$, $A_2$, $B_1$, $B_2$ and the focusing error signals $\epsilon(z)$ by then forming the difference between the sums of the signals from groups of two cells having the same ordinate $[(A_1+A_2)-(B_1+B_2)]$.

The radial deviation signal can also be obtained from the same detection cells by forming the difference between the signals obtained by the summation of signals from cells $A_1$, $B_1$ and $A_2$, $B_2$ having the same abscissa. This signal $[(A_1+B_1)-(A_2+B_2)]$ is only significant when a hole is illuminated on the reflecting support. Thus, in this case, an overall intensity drop is detected level with the reading signal and in accordance with the sign of the radial deviation with respect to the track. This intensity drop occurs in a preponderant manner in an intensity drop affecting the cells having the same abscissa (following the radial axis X) which is positive in FIG. 6B and negative in FIG. 6c or is equally distributed between said two groups of cells in FIGS. 6a (When the radial variation in zero).

The device shown in FIG. 2 relates to an optical head for a disk reading device. The laser power necessary for such a reading is low and can therefore easily be obtained by means of a semiconductor laser. By using appropriate inscription layers for the disk, it is also possible to provide an optical head for recording the disk, which also uses a semiconductor laser source. In this case, it is also possible to associate with the optical head of FIG. 2 a semiconductor laser source which is used for recording purposes. It is then possible to read an information element immediately after its recording, for example for checking the recording in real time or in a subsequent phase.

FIG. 7 shows an optical head according to the invention permitting the recording and reading of information in the disk. In FIG. 7, the same components as in FIG. 2 are given the same references. The reading part of the optical head is exactly the same as that shown in FIG. 2. Moreover, the optical system formed by lenses 11 and 12 is used for recording and for reading. The recording part also has a semiconductor laser source 10, which is displaced relative to the optical axis of the associated lenses 11 and 12. The control current of this laser source 10 is modulated by the signal $E_S$ to be recorded on the disk. This modulation of the laser is translated by an all or nothing modulation of the emitted radiation, making it possible to etch in the photosensitive layer of the disk microdomains of variable length and spacing along a spiral track, whose displacement direction relative to the writing spot $E_0$ projected on the disk by the optical system 11 and 12 is determined by the direction of axis y. This point $E_0$ is positioned in front of the reading spot $M_0$ defined hereinbefore, due to the displacement of the laser source 10 relative to the optical axis on which was located the laser reading source 1. Like the laser reading source 1, the laser writing source only illuminates a half-pupil of the entrance lens 1, said arrangement being particularly matched to the divergence characteristics of the beam from a semiconductor laser.

Part of the inscription radiation not absorbed for the etching is reflected by the support and in an optical real time reading and recording device where two lasers operate simultaneously this inscription radiation reflected by the support can disturb the reading. To prevent this disadvantage, mask 15 is provided to occult this beam at the image point $E_0'$ of $E_0$ with respect to the optical systems formed by lenses 11 and 12 and prism 3.

Therefore, the vertical and radial error signals can be utilized in the following manner. Lens 12 is fixed to a coil 16 placed in the gap of a permanent magnet 17 in such a way that when the coil is traversed by a current which is a function of the signal $\epsilon(z)$ a force is created which brings about a vertical displacement of the assembly formed by the coil and lens 12. The other elements of the optical head, namely lasers 1 and 10, lens 11, prism 3 and cells $A_1, A_2, B_1, B_2$ are fixed in accordance with the vertical axis z of the head. The only element which moves in accordance with z is the said coil—lens assembly.

In order to follow the track by means of the radial error signal $\epsilon(z)$, it is possible to use an electrically controlled moving element of the piezoelectric type which is fixed to an element of the optical head bringing about a radial displacement in accordance with x of the reading spot, i.e. either the semiconductor laser source 1 or the lens 11. Such a piezoelectric element 18 shown in FIG. 7 fixed to two lasers 1 and 10 can also permit radial wobbulation when an alternating signal is superimposed on the radial error signal $\epsilon(x)$. The reading spot is displaced on either side of the hollow track and the error signal is obtained by synchronous detection.

FIG. 7 which shows the optical head does not show the signal processing circuits supplying the control signal applied to the different elements of the optical head.

The invention is not limited to the embodiments of the optical head described and represented herein. In particular, for an optical head to be used for recording and reading, it is possible to use a multiple laser source for the recording which has a plurality of semiconductor lasers integrated onto the same support. The distance between the different lasers is such that after imagery by the optical system, the spots projected for etching the various parallel tracks are correctly spaced.

Moreover, in the embodiments represented hereinbefore, the reading laser source has been shown on the optical axis of the projection device. However, this arrangement is not limitative and the reading laser source can be placed outside this optical axis. Conversely, the recording laser source can be placed on the optical axis in the case when the optical head is used almost simultaneously for recording and reading. All that is necessary is that the spots follow one another in the correct order relative to the disk displacement direction.

Instead of illuminating by the laser reading source an area defined by the diameter of the entrance pupil, it is also possible to displace this area towards the centre, so as to obtain a more regular spot. In this case, the deflecting member is displaced relative to the axis and the beam reflected by the support is only partly used. A compromise must then be found which is between obtaining a correct reading spot and an adequate detection level on the reading cell.

What is claimed is:

1. An optical reading head comprising:
a semiconductor laser source having an emissive face in the shape of a rectangular window for producing an input light beam;
an optical projecting device for receiving said light beam and for forming a spot of light which is the image of said laser source in the plane of a reflective information carrier, whereby a reflected light beam is formed;
said emissive face being oriented so that said input light beam asymmetrically illuminates the entrance pupil of the optical projection device and said reflected light beam asymmetrically illuminates the entrance pupil of the optical projection device, whereby the portions of the optical projection device which are illuminated by the input and reflected beams are adjoining and include most of the area of said entrance pupil;
a deflecting member for receiving said reflected light beam from said optical projection device and for displacing the image formed in respect to said emissive face wherein said deflecting member is a prism positioned in an area where the wave surface is planar, the prism having its edge parallel to the side of the table formed in the entrance pupil; and
detection cells for receiving said reflected beam from said deflecting member.

2. An optical reading head comprising:
a semiconductor laser source having an emissive face in the shape of a rectangular window for producing an input light beam;

an optical projecting device for receiving said light beam and for forming a spot of light which is the image of said laser source in the plane of a reflective information carrier, whereby a reflected light beam is formed;

said emissive face being oriented so that said input light beam asymmetrically illuminates the entrance pupil of the optical projection device and said reflected light beam asymmetrically illuminates the entrance pupil of the optical projection device, whereby the portions of the optical projection device which are illuminated by the input and reflected beams are adjoining and include most of the area of said entrance pupil;

a deflecting member for receiving said reflected light beam from said optical projection device and for displacing the image formed in respect to said emissive face; and detection cells for receiving said reflected beam from said deflecting member.

3. An optical reading head according to claim 2, wherein said input beam illuminates the entrance pupil in a half-pupil, the rectangular emissive window of the semiconductor laser source being positioned in such a way that its large dimension is orthogonal to the axis defining the two halfpupils.

4. An optical reading head according to claim 2, wherein the detection cells are placed in a plane orthogonal to the optical axis of the optical projection device and contain four quadrants, said plane having a dimension which differs from that of the emissive face of the source, the quadrants being such that the radiation received by the cells is equal when the reading spot is properly positioned.

5. An optical reading head comprising:

a semiconductor laser source having an emissive face in the shape of a rectangular window for producing an input light beam;

an optical projecting device for receiving said light beam and for forming a spot of light which is the image of said laser source in the plane of a reflective information carrier, whereby a reflected light beam is formed;

said emissive face being oriented so that said input light beam asymmetrically illuminates the entrance pupil of the optical projection device and said reflected light beam asymmetrically illuminates the entrance pupil of the optical projection device, whereby the portions of the optical projection device which are illuminated by the input and reflected beams are adjoining and include most of the area of said entrance pupil;

a deflecting member for receiving said reflected light beam from said optical projection device and for displacing the image formed in respect to said emissive face;

detection cells for receiving said reflected beam from said deflecting member; and a recording semiconductor laser source associated with the same optical projection device in a position adjacent to said semiconductor laser source in order to project onto the information carrier a recording spot which is displaced relative to the reading spot in such a way that the reading head can simultaneously record and read the carrier.

6. An optical reading head according to claim 5, wherein the recording laser source is oriented in such a way that the entrance pupil of the optical projection device is illuminated by the recording beam in the same area as illuminated by the reading beam, the part not absorbed by the information carrier for the recording being reflected whilst following a separate path from the corresponding incident beam, a mask provided in the focusing plane to occult the reflected recording beam without disturbing the reflected reading beam.

7. A device for reading by reflection an information carrier and for recording information on said information carrier incorporating an optical reading head according to claim 6, wherein the information is recorded on the information carrier along a track, so that the reading head is positioned with respect to the information carrier in such a way that the large dimension of the emissive rectangular window of the reading semiconductor laser source is parallel to the displacement direction of the information carrier relative to the optical head.

8. A reading device according to claim 7 wherein the recording semiconducting laser source is displaced relative to the optical axis in the travel direction in such a way that the recording spot is formed before the reading spot when considering the direction of movement of the information carrier relative to the optical head.

* * * * *